S. J. GRAF.
SIDE SEAT FOR MOTOR CYCLES.
APPLICATION FILED MAR. 19, 1918.
1,278,909.
Patented Sept. 17, 1918.
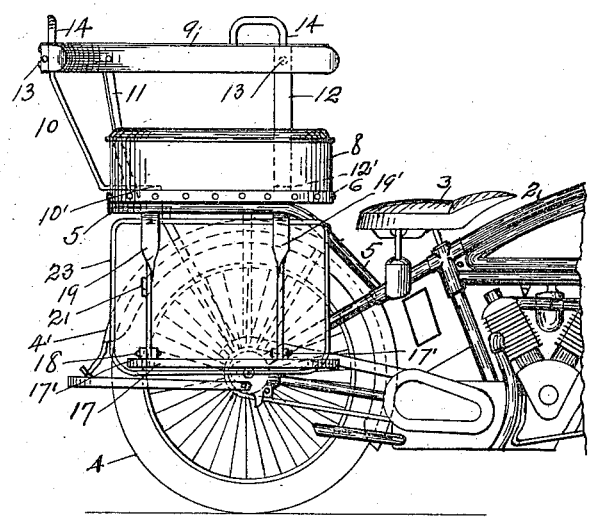
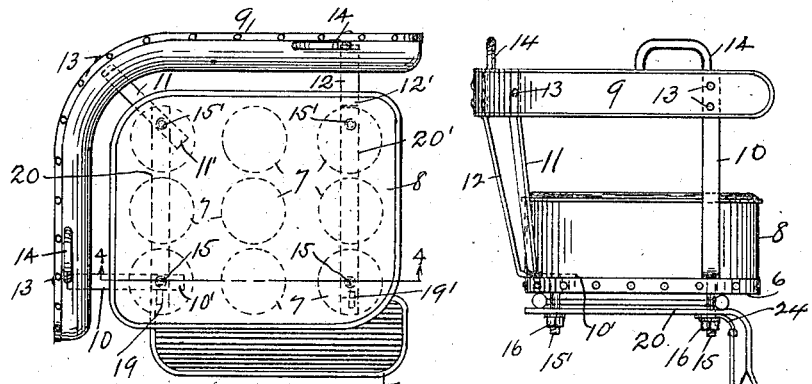
INVENTOR
Simon J. Graf
BY
Harry D. Wallace
ATTORNEY

UNITED STATES PATENT OFFICE.

SIMON J. GRAF, OF SYRACUSE, NEW YORK, ASSIGNOR TO WILLIAM J. BURKE, OF SYRACUSE, NEW YORK.

SIDE SEAT FOR MOTOR-CYCLES.

1,278,909.  Specification of Letters Patent.  Patented Sept. 17, 1918.

Application filed March 19, 1918. Serial No. 223,303.

*To all whom it may concern:*

Be it known that I, SIMON J. GRAF, a citizen of Germany, residing at Syracuse, in the county of Onondaga and State of New York, have invented certain new and useful Improvements in Side Seats for Motor-Cycles, of which the following is a specification.

This invention relates to improvements in side-seats, designed for use in connection with motor-cycles, to accommodate a passenger.

The object of the invention is to provide a novel, simple, substantial and easy-riding seat of the class for motor-cycles, which may be readily and securely mounted above the rear wheel of the machine. A further object is to provide novel, simple and effective means for attaching the seat to the vehicle. And a further object is to generally improve and simplify the construction of and to render more safe and comfortable side-seats of the class.

The various features and parts will be understood from the detailed description which follows, and by reference to the accompanying drawing, in which—

Figure 1 is a broken side elevation of a motor-cycle; showing my improved seat applied thereto, in front elevation.

Fig. 2 is an enlarged top-plan view of the seat.

Fig. 3 is a rear-end view of the same.

Fig. 4 is a vertical longitudinal section, taken on line 4—4 of Fig. 2.

In the drawing, 2 represents the frame of a motor-cycle, 3 the driver's seat, 4 the rear wheel, and 5 represents the usual luggage carrier, which is generally mounted directly above the rear wheel 4.

My improved side or passenger seat is intended for "tandem riding," and is preferably mounted upon the luggage carrier 5, to which it is detachably secured, and consists of the following parts: 6 represents the base or bottom of the seat proper, which may be made of wood, or other suitable material. Upon the base 6 is disposed a number of cushion springs 7 (shown in Figs. 2 and 4), and these springs are preferably inclosed in a leather or other suitable flexible casing 8. The springs and the other cushion parts may preferably follow the usual construction for car and other similar seats. 9 represents an L-shaped back or guard-rail, which is disposed above and is spaced from the seat, and preferably guards the rear-side and rear-end of the seat and prevents the occupant of the seat from being accidentally throw off in those directions, while the motor-cycle is traveling at high speed and over rough roads. This rail is preferably cushioned on its front side facing the seat. The rail 9 is supported by a plurality of braces, as 10, 11 and 12, which are secured to the rail by bolts 13. These braces are bent at suitable angles and their lower ends or feet, as 10', 11' and 12' rest upon the top side of the base 6 (see Fig. 2), to which they may be suitably and permanently secured. 14 represents staple-like hand loops, which are disposed on the top edge of the back 9, as shown in Figs. 1, 2 and 3. 15—15' represent bolts which have their upper ends threaded into or otherwise permanently attached to the feet of the braces 10, 11 and 12, and thence pass downwardly through the bottom 6 of the seat. The lower ends of the bolts are threaded and fitted with nuts 16. 17 represents a foot-rest or platform, which is disposed horizontally across the center of the wheel 4. The platform 17 is pivoted by means of lugs 17' and pins 18 to the depending arms of a pair of braces 19—19'. The upper ends of the braces 19—19' are bent at right angles to provide horizontal arms 20—20', which are disposed across the underside of the base 6 of the seat. The arms 20—20' are perforated to receive the bolts 15—15'.

To apply my improved seat to a motor-cycle, the nuts 16 are unscrewed and the braces 19—19' removed from the bolts. The seat is then placed in position on top of the luggage carrier 5, as shown in Figs. 1, 3 and 4, and the arms 20—20' of the foot-rest braces are then inserted between the luggage carrier and the top of the rear-wheel fender 4'. The bolts 15—15' are next inserted through the said arms and the nuts 16 are then applied to the bolts and tightened up. This operation which may be accomplished in a few minutes' times securely fastens the seat in the operative position. In the preferred arrangement of the parts, the bolts 15—15' are positioned between the opposite side-members of the luggage carrier, as best seen in Fig. 3. This prevents the seat from shifting laterally by the jarring and jolting of the machine. The foot rest 17 is preferably pivoted to the braces 19—19', so that it may be tilted or folded up when not in use, as shown by the dotted lines in Fig. 3, and when so folded up, a latch 21 which is pivoted to the brace 19 by a pin 21' engages a hook 22 carried by the platform 17. To prevent the clothing of the occupant of the seat from becoming torn or soiled by the wheel 4, I provide an apron or shield 23, which is disposed vertically between the said wheel and the braces 19—19'. This apron is supported by suitable clips 24, which are held in place by the bolts 15, as shown in Fig. 3.

Having thus described my invention, what I claim as new and desire to secure by Letters Patent, is—

The combination with a luggage carrier, of a side-seat mounted on said carrier, a plurality of bolts depending from the seat and disposed between opposite side members of said carrier, a foot-rest associated with the seat, a pair of angular braces supporting the foot-rest, the corresponding arms of said braces disposed beneath said side members and having perforations to receive the bolts for clamping the seat to said side members, and an L-shaped guard-rail guarding the rear-side and rear-end of the seat, said guard-rail being supported by braces having feet engaging the top of the seat to which the bolts are rigidly connected.

In testimony whereof I affix my signature.

SIMON J. GRAF.

Copies of this patent may be obtained for five cents each, by addressing the "Commissioner of Patents, Washington, D. C."